(12) United States Patent
Boda

(10) Patent No.: US 7,861,481 B2
(45) Date of Patent: Jan. 4, 2011

(54) FLOOR COVERING

(75) Inventor: Dirk Boda, Bergheim (DE)

(73) Assignee: EPS GmbH, Cologne (DE)

( * ) Notice: Subject to any disclaimer, the term of this patent is extended or adjusted under 35 U.S.C. 154(b) by 356 days.

(21) Appl. No.: 12/019,997

(22) Filed: Jan. 25, 2008

(65) Prior Publication Data

US 2008/0202055 A1  Aug. 28, 2008

(30) Foreign Application Priority Data

Jan. 25, 2007 (DE) ................ 10 2007 004 662
Jan. 25, 2008 (DE) ................ 10 2008 006 251

(51) Int. Cl.
*E04B 5/00* (2006.01)
(52) U.S. Cl. .................... 52/582.1; 52/586.2
(58) Field of Classification Search ............ 52/177, 52/582.1, 582.2, 592.1, 650.3, 572, 581, 52/586.2; 403/331, 364
See application file for complete search history.

(56) References Cited

U.S. PATENT DOCUMENTS 3,175,476 A * 3/1965 Franks ................ 404/35
3,348,459 A * 10/1967 Harvey ................ 404/35
4,569,167 A * 2/1986 Staples ................ 52/92.2
6,421,968 B2 * 7/2002 Degelsegger ........... 52/204.62

* cited by examiner

*Primary Examiner*—Brian E Glessner
*Assistant Examiner*—Patrick Maestri
(74) *Attorney, Agent, or Firm*—Summa, Additon & Ashe, P.A.

(57) ABSTRACT

The invention relates to a connecting element (24) for a floor covering (20) consisting of a first part element (26) and a second part element (28), each having connecting openings (34) by which means they can be connected to one another by a connecting means (36). In the assembled state these form a connecting channel (38) in which a connector (40) can be disposed, which connector also has a connecting opening (34) for the connecting means (36), wherein the connector (40) projects laterally from the connecting element (24) in such a manner that it can be inserted into a connecting channel (38) of a neighbouring connecting element (24) and a connecting means (36) can likewise extend there through a second connecting opening (34) so that two connecting means (36) located adjacent to one another can be connected to one another by the connector (40), wherein the connecting means (36) has dimensions such that it does not protrude over a useful area (21) of the floor covering (20) (FIG. 5).

11 Claims, 6 Drawing Sheets

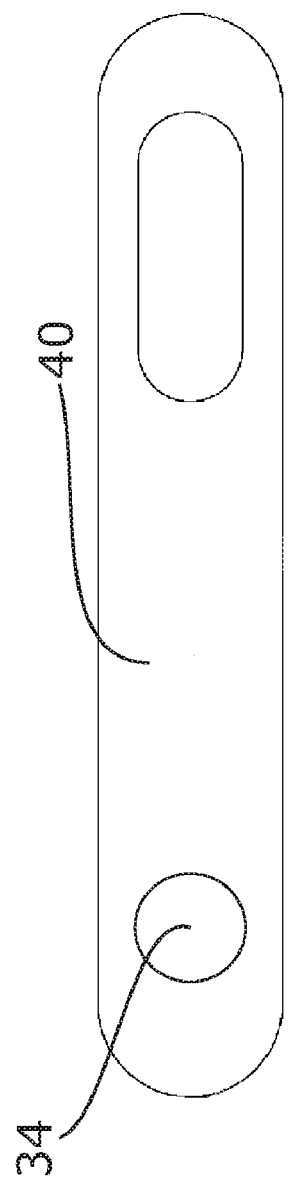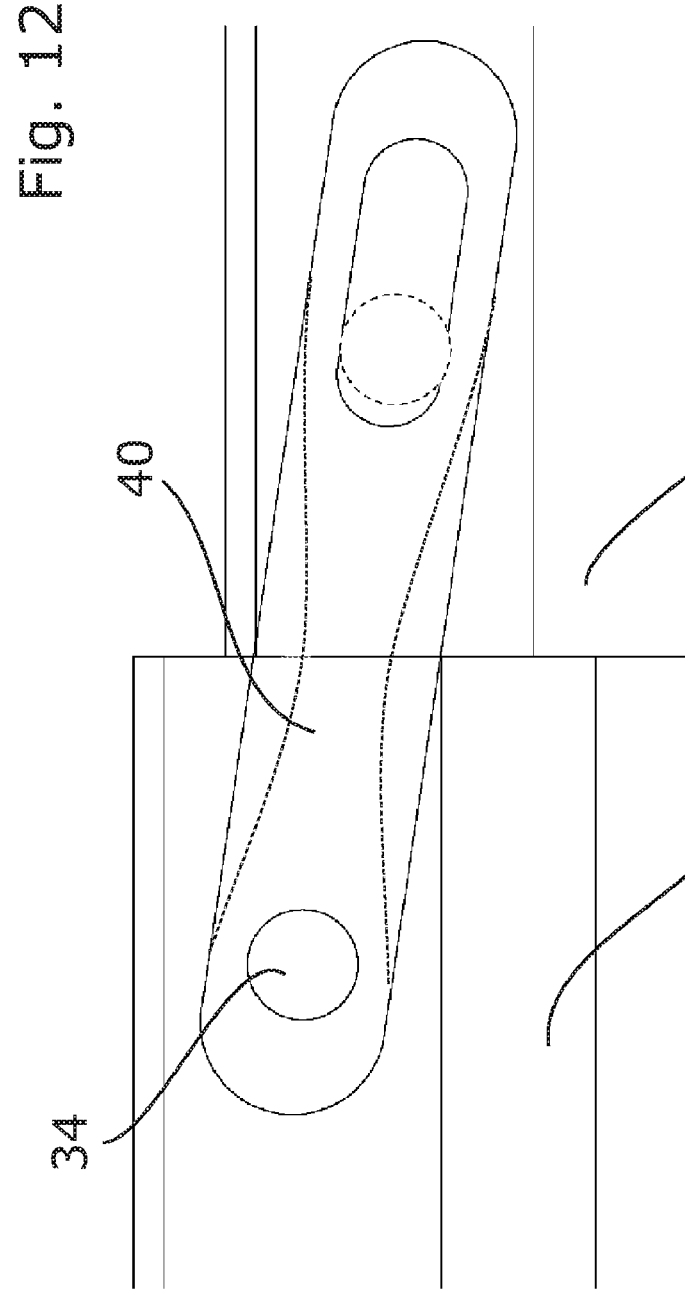

FLOOR COVERING

Figure 1:
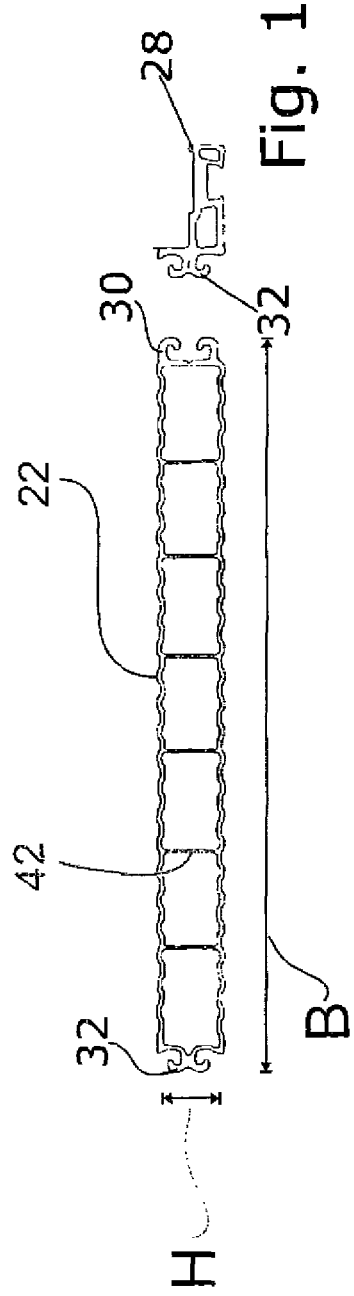

The present invention relates to a connecting element for floor segments of a floor covering.

In many cases, floor coverings are used as floor protection systems but they are frequently used to create a flat surface which is as uniform as possible and thereby also ensure a uniform load distribution. Floor coverings are suitable as transport paths or staging substructure for exhibitions, approaches to building sites, path broadening, mounting platforms and storage surfaces. However, they can also be used to protect sensitive surfaces such as cobblestones or tartan tracks in stadiums, but particularly on grass surfaces such as football pitches and similar. For this purpose further protective measures such as an underlay of the floor covering with rubber mats or textiles is frequently appropriate.

Floor coverings of this type usually consist of individual floor segments which are connected to one another on site with the aid of connecting means. For this purpose, the floor segments usually have through openings which are disposed along the longitudinal and/or transverse sides. When laying on site, the floor segments are initially placed adjacent to one another, suitable tabs also having openings at the ends are placed on the openings of two floor segments, connecting means, preferably screws, are passed through the openings and the tabs are screwed to the floor segments which are then connected to one another.

A disadvantage with this type of connection is that the tabs and optionally also the connecting means project upwardly or outwardly with respect to the newly created base. There is a risk that persons will trip over these or vehicles or their tyres or tracks will be damaged by driving thereover.

A further significant disadvantage of such systems is the high weight of the floor segments. Since large surfaces such as football pitches or similar are frequently covered, a correspondingly large number of floor segments must be delivered and moved on site. Since in many cases floor segments must withstand a wheel load of up to 6 tonnes, they are designed to be suitably solid, they are made of solid material or have large wall thickness when designed as hollow bodies.

The object of the invention is to provide a connecting element for a floor covering which permits reliable connection of floor segments. At the same time, the surface newly created by the floor covering should be as flat as possible and have no protruding elements. Furthermore, it should be possible to lay or assemble the floor covering and the connecting means quickly and easily. It should be possible to produce the connecting element at a favourable cost and it should have the lowest possible weight.

According to the invention, the object is achieved by a connecting element consisting of a first part element and a second part element, each having connecting openings by which means they can be connected to one another by a connecting means, and which in the assembled state form a connecting channel in which a connector can be disposed, which connector also has a connecting opening for the connecting means, wherein the connector projects laterally from the connecting element in such a manner that it can be inserted into a connecting channel of a neighbouring connecting element and a connecting means can likewise extend there through a second connecting opening so that two connecting means located adjacent to one another can be connected to one another by the connector, wherein the connecting means has dimensions such that it does not protrude over a useful area of the floor covering.

An important advantage of the invention consists in that a flat surface can be created with the floor covering from which no connecting means, tabs or similar protrude. For this purpose, the part elements have openings into which the connecting means, preferably screws, can be recessed, such that a screw head and screw nut do not protrude with respect to the connecting element and the useful area of the floor covering. The connectors required to connect the floor segments to one another in the transverse direction are located inside the connecting elements which connect the floor segments in the longitudinal direction. The connecting means which are pushed through the connecting openings of the part elements and the connector therefore simultaneously connect the connector to the connecting elements and also the part elements of a connecting element to one another. In contrast to the usual fastening of the connectors on the upper side of the floor covering in the prior art, the connectors disposed inside the connecting elements according to the invention are advantageously better protected against contamination and weathering influences.

Another important advantage of the invention is that both the connecting element and also the floor segments themselves only have a very low weight. The connecting element is substantially configured as a hollow body whereby a considerable reduction in weight is achieved.

According to the invention, the part segments are designed in such a manner that as much material of the part segments as possible is located between the screw head and the screw nut. In other words, the screw head and the screw nut are spaced as far apart as possible, and therefore utilize the entire height of the connecting element. This has the result that the connection is also very resistant to kinking or pivoting movements. Such forces can occur, for example when a vehicle is standing on a first floor segment and a second floor segment connected to this floor segment is accidentally raised (for example, by a fork lift truck) or is pressed into a dip in the ground, for example, by a second vehicle. In both cases, the connection is severely stressed in the area of the screws as a result of the lever forces caused by the movement of the floor segments upwards or downwards and if the connecting element is inadequately designed, the connection could come loose.

The connecting element according to the invention prevents any too-severe kinking or pivoting movement inside the connecting element by dissipating the forces via the material between the screw head and the screw nut and the frame structure of the part segments into the adjoining floor segments.

At least one connecting opening of the part elements for receiving the connecting means is advantageously configured as an elongated hole to allow a certain movement of the connection in the transverse direction. The same applies to the connector in which at least one connecting opening is designed as an elongated hole to achieve the desired tolerance in the longitudinal direction. By this means it is possible to respond quickly and easily to material tolerances, mechanical deformation of the floor segments and connecting elements or uneven and nonuniform floors on site during laying of the floor.

In a particular advantageous embodiment, the connector has a smaller width than the connecting channel so that it can be pivoted by a certain degree inside the connecting channel about the connecting means disposed at both ends, i.e. it can be pivoted until the connector impacts laterally against the connecting channel wall in the area of the open end of the connecting channel, which further facilitates assembly and laying on site. The pivotability of the connectors has the effect that the floor segments can be arranged offset with respect to one another within certain limits. The degree of possible pivoting movement inside the connecting channel can be further increased by a waisting of the connector according to the invention. The waisting has the effect that the connector only impacts later against the connecting channel wall. Furthermore, such waisting also has the advantage of a considerable reduction in weight.

The connectors preferably have a height which exceeds the height of the connecting channel by a certain amount, for example, by 0.1 mm when the height of the connecting channel is about 4 mm. The overlap results in a clamping effect when joining together and screwing the part elements so that the two part elements are firmly connected to one another and undesirable development of noise due to vibrations or movements of the connector inside the connecting channels is avoided.

The connecting means let into the connecting element can be covered by a cover on their upper side to create a continuous floor covering without openings. In contrast to known floor coverings, it is thereby feasible to use the floor covering according to the invention for a plurality of further possible applications. This includes, inter alia, the use as a sports floor covering or for similar events for which it is necessary to have a floor surface without protruding elements or even openings. Unlike the hitherto known floors of this type, the floor created with the aid of the connecting elements according to the invention meets the requirements of the Assembly Ordinance in the sense of EU law since it has no impermissible tripping hazards.

Furthermore, the connecting elements according to the invention have fastening means on their longitudinal sides for fastening to the floor segments to be connected. The fastening means can in principle be arbitrarily designed but detachable connections have proved to be advantageous. In an advantageous embodiment, the first part element comprises a type of claw and the second part element a double hook which is compatible therewith. The floor segments likewise have the claw on one side and the double hook on the other side.

Depending on the requirement on site, it should therefore be decided whether the floor segment should be connected directly to one another via their claw/double hook connection or whether a floor segments should be connected to the next floor segment via a connecting means. The connection of floor segments via connecting means is therefore necessary so that rows of floor segments can be connected to one another at the front.

It has proved to be advantageous if two or more, preferably four floor segments are connected to one another by the fastening means according to the invention to form a panel, where a plurality of such panels can again be joined together by the connecting means according to the invention to form a row of any length. Such a row can be connected to a neighbouring row by means of the connectors of the individual connecting elements so that the two connected rows lie adjacent to one another almost free of gaps.

Floor segments having a length of about 3 meters and a width of about 0.5 m have provided to be suitable for use as stadium floor covering. A panel consisting of four floor segments therefore has a total area of about 3×2 meters and can easily be transported in a closed truck. On site the prefabricated panels only need to be joined together by means of the connecting elements according to the invention.

According to the invention, floor segments designed for a wheel load of up to 6 tonnes are made of aluminium, approximately 5 cm high and configured as hollow bodies to save weight. In order to nevertheless achieve sufficient statics, supporting webs are provided inside the hollow bodies, connecting the lower side to the upper side and thus supporting the accessible upper side. If the total width of a floor segment is about 0.5 m, the supporting webs are at a distance of about 6 cm from one another, thus forming 8 chambers inside the floor segment.

According to the invention, the wall thickness of the upper side is 3.5 mm whereas the wall thickness of the lower side is only 3 mm. The wall thickness of the supporting webs is likewise only about 3 mm. This configuration according to the invention having relatively few supporting webs and only a small wall thickness is substantially lighter than comparable known floor segments. The hollow chamber design and the use of the supporting webs allow the significantly smaller wall thickness of the upper side and the lower side. The somewhat larger wall thickness of the upper side effectively prevents stamping-in, for example, caused by a nail left lying around or similar. A panel composed of four floor segments according to the invention with two laterally disposed part elements weighs only about 175 kg which is a significant improvement on known floors. Such a panel can easily be carried by four persons and can easily be laid on site. Nevertheless, the floor segment according to the invention has sufficient dimensions to withstand the required wheel loads of up to 6 tonnes.

Figure 2:
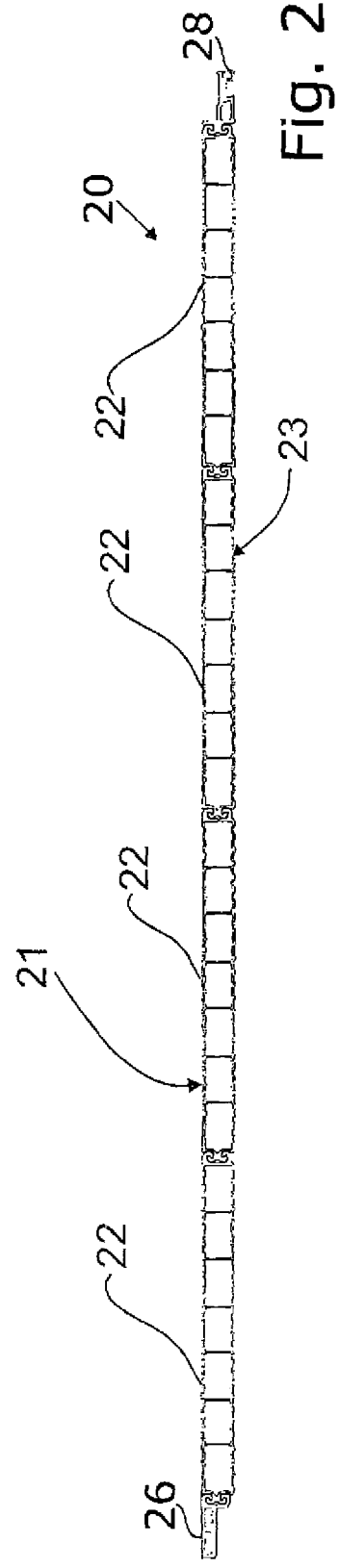
Figure 3:
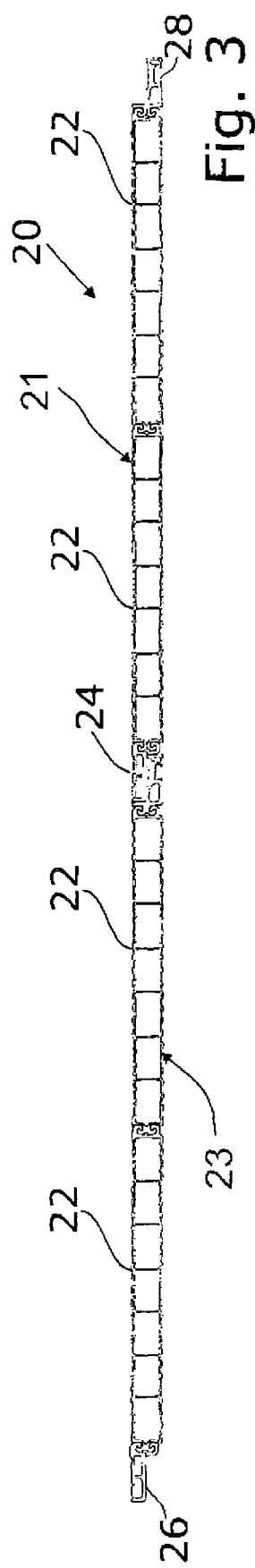
Figure 4:
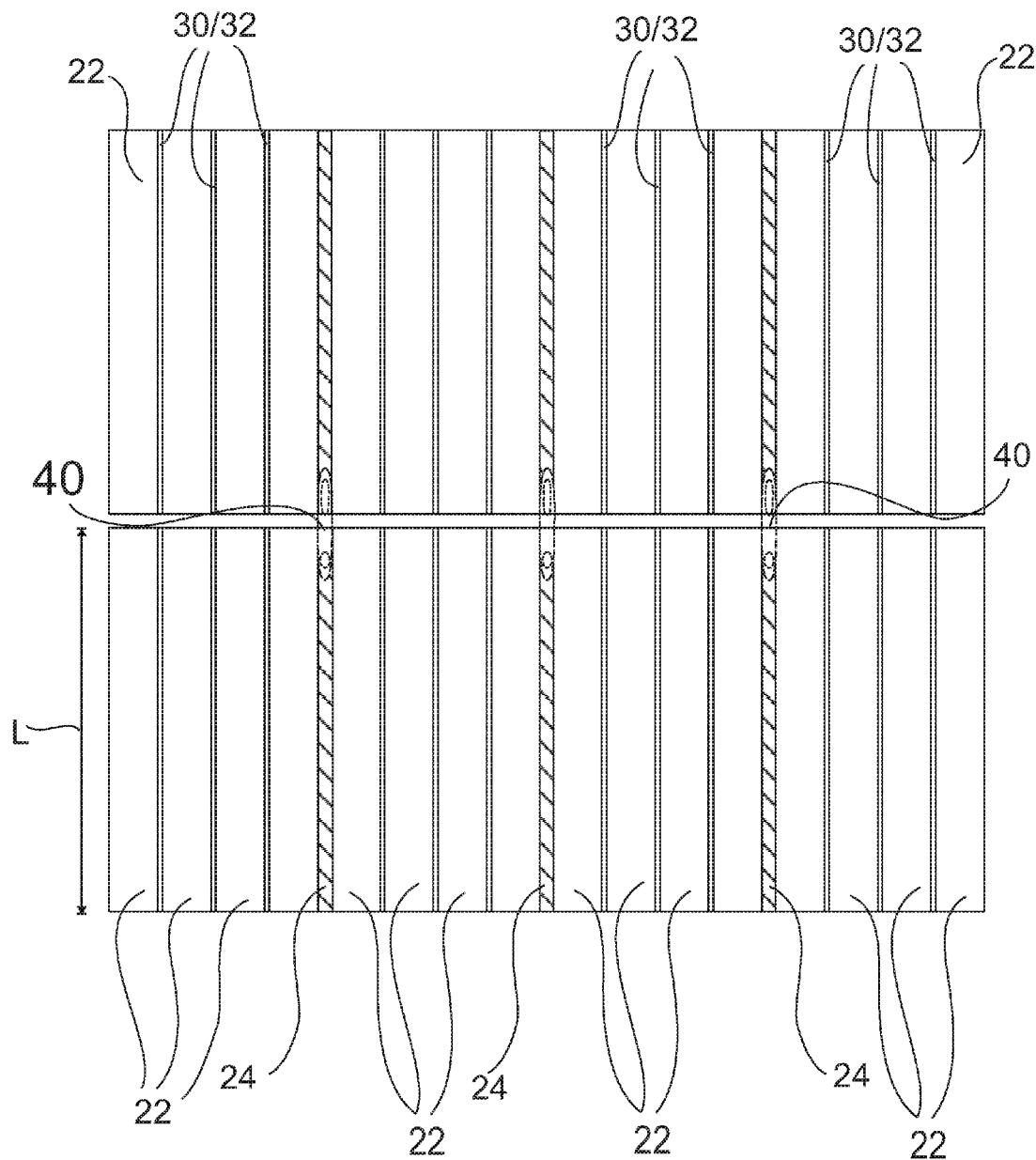
Figure 5:
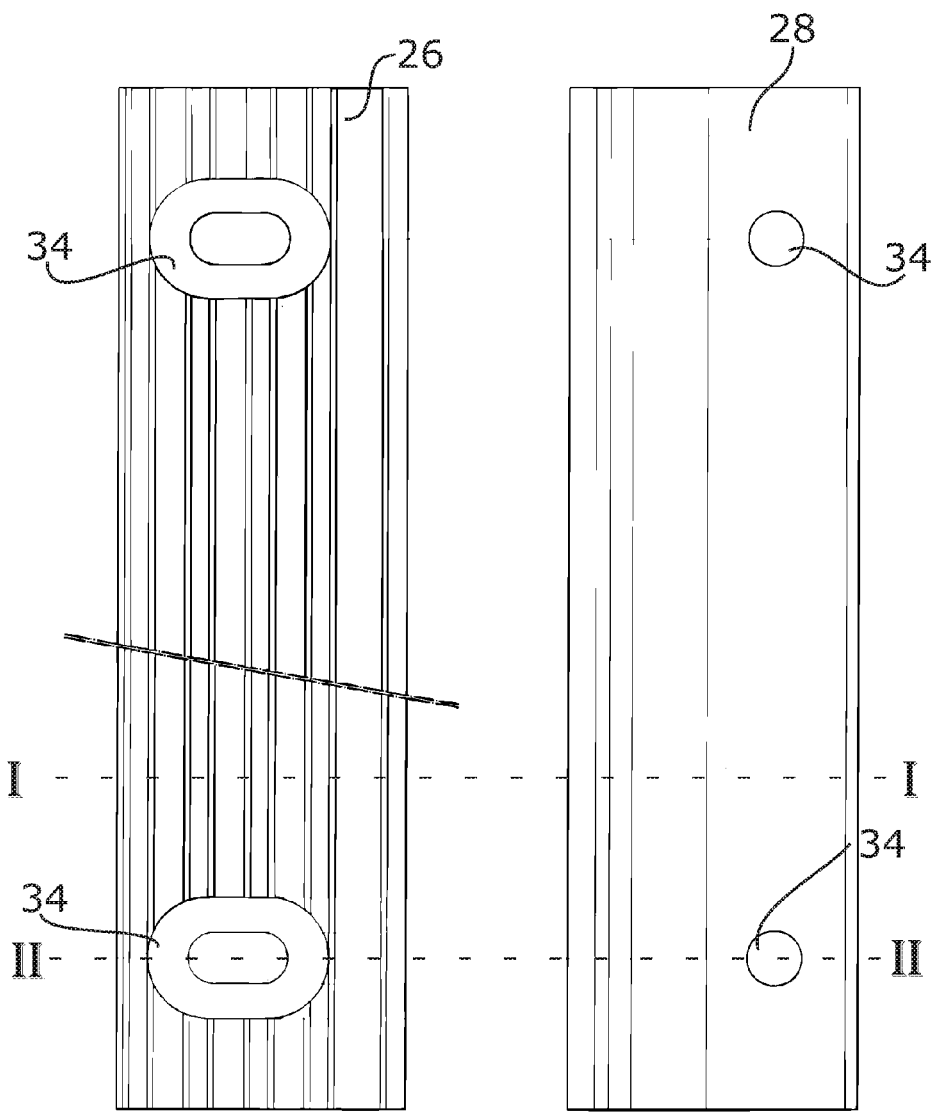
Figure 5:
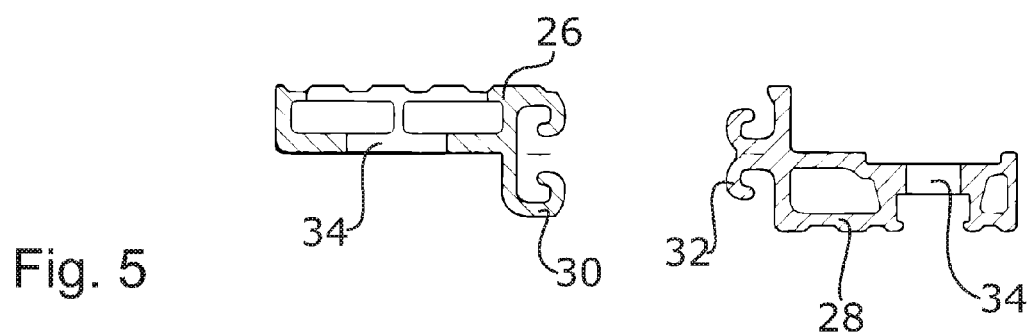
Figure 6:
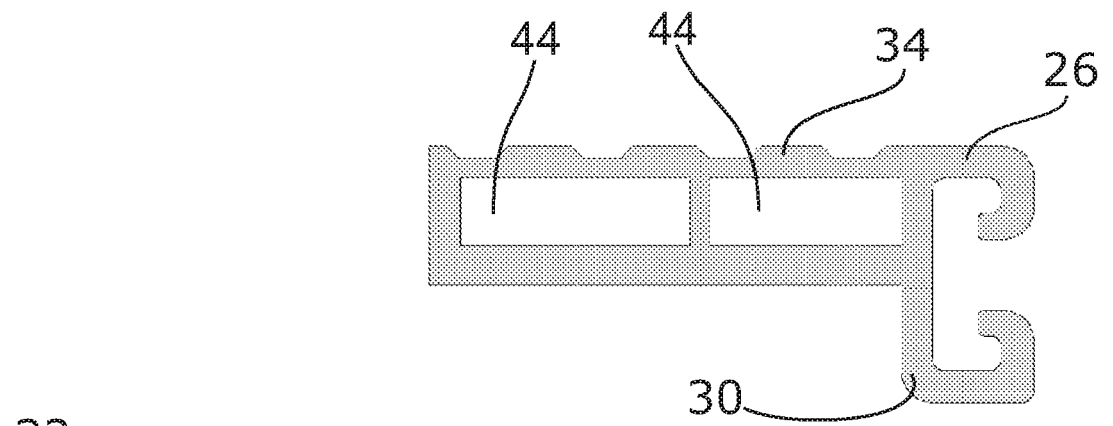
Figure 7:
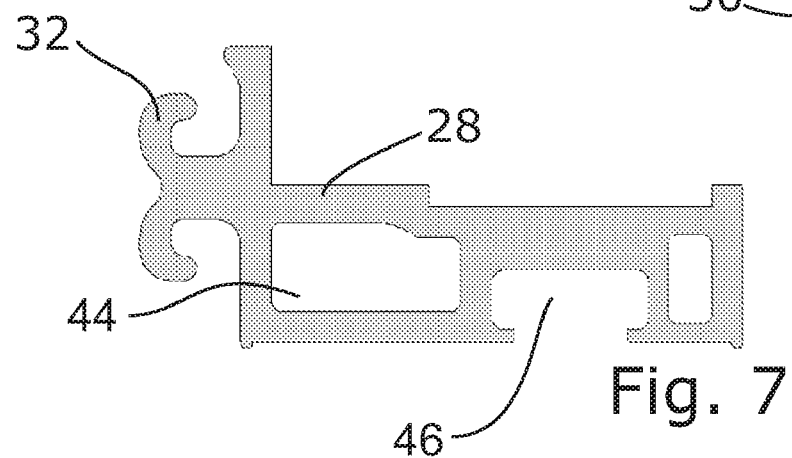
Figure 8:
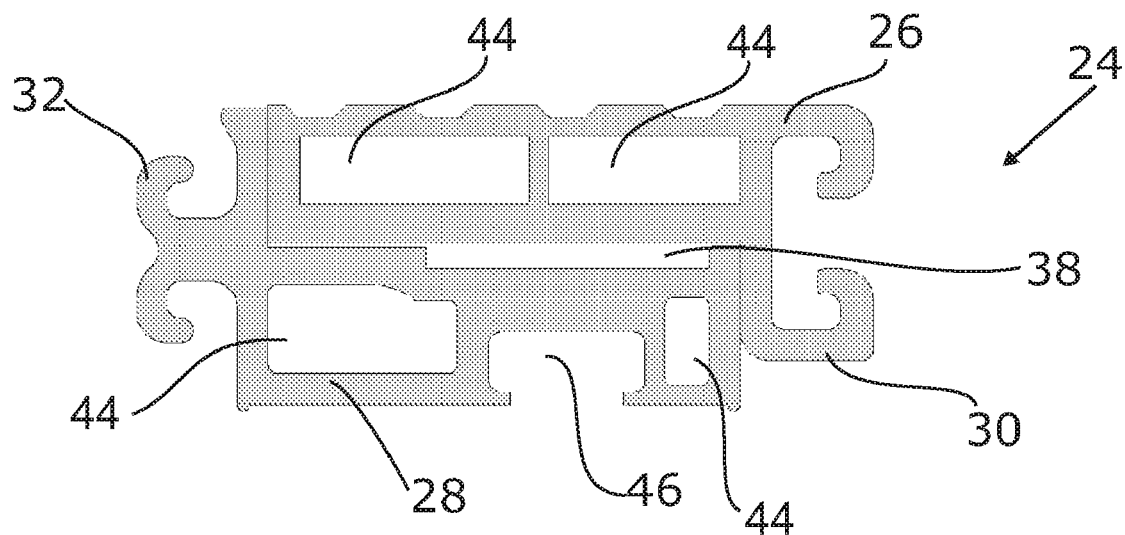

The invention is explained in detail with reference to the following figures. In the figures:

FIGS. 1 to 3: show a sectional view of a floor covering with connecting elements according to the invention, FIG. 4: is a schematic diagram of a floor covering from above, FIG. 5 shows two part elements in sectional view and from above, FIG. 6: is a sectional view of a first part element of a connecting element according to I-I in FIG. 5;

FIG. 7: is a sectional view of a second part element of a connecting element according to I-I in FIG. 5;

FIG. 8: shows the two part elements from FIG. 6 and FIG. 7 in the assembled state using a connecting means.

Figure 9:
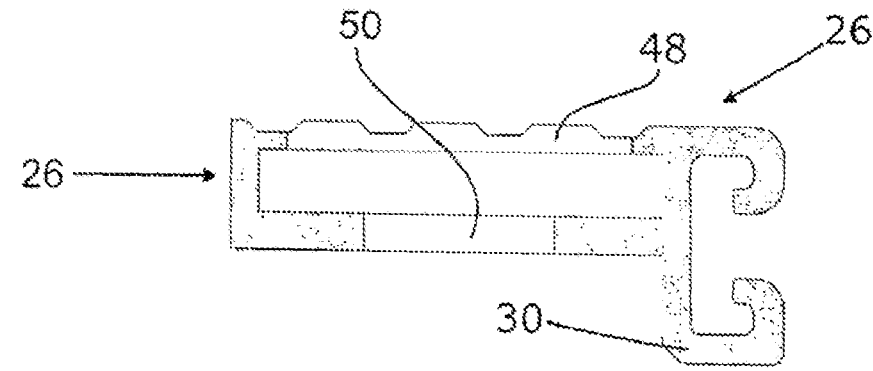
Figure 10:
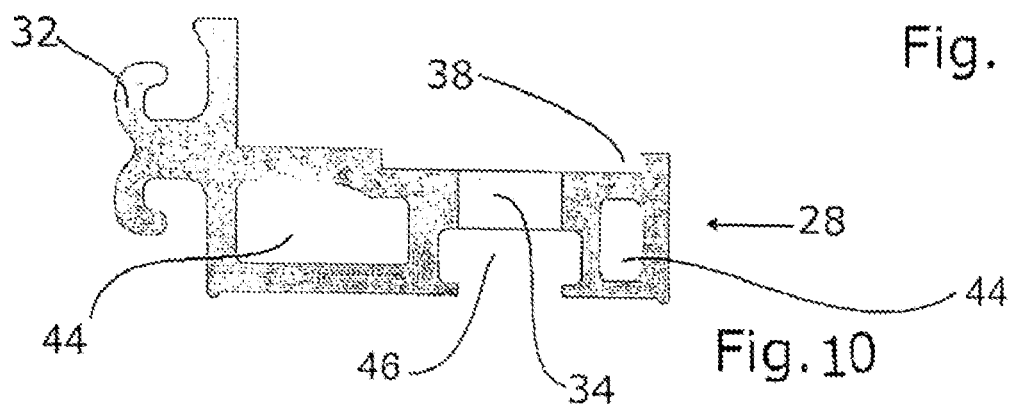
Figure 11:
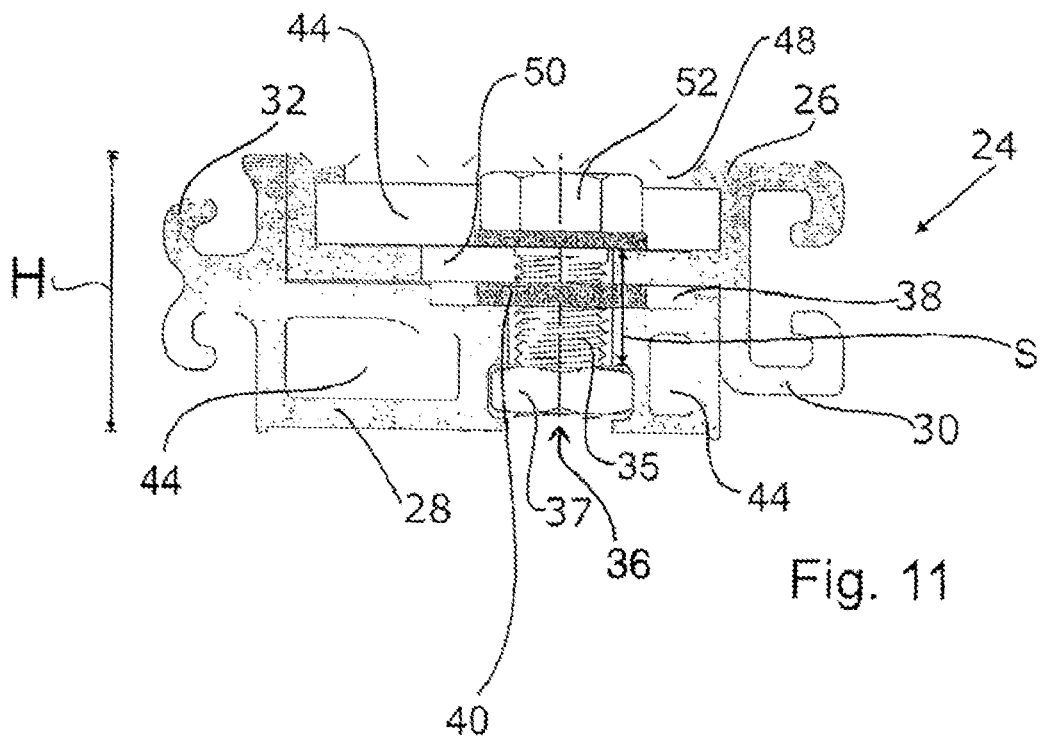

FIG. 9 to 11: show sectional views of the part elements or the connecting element according to II-II in FIG. 5, FIG. 12: is a connector according to the invention, FIG. 13: is a connector according to the invention inserted in two part elements.

FIGS. 1 to 3 show a floor covering 20 consisting of individual floor segments 22 which are connected to one another and consist of a resistant material such as steel, aluminium or rubber. The floor covering 20 formed from floor segments 22 has a useful area 21 and a bearing surface 23 facing an undersurface, which are both designed as corrugated or slightly profiled in the exemplary embodiment shown. The floor segments 22 are designed as hollow bodies with supporting webs 42 extending vertically therein.

The floor segments 22 have claws 30 located at the ends on the longitudinal side and double hooks 32 located on the other side which can be inserted into the claws 30 of the adjacent floor segment 22. The floor segments 22 are either connected directly to one another or by means of connecting elements 24.

The individual floor segments 22 preferably have a length L of about 3 m (cf. FIG. 4) and a width B of about 0.5 m, preferably 0.53 m.

FIGS. 2 and 3 illustrate the laying of floor segments 22 to form a row, a connecting means 24 being provided after four floor segments 22. In this case, the connecting means 24 are not only used to connect the floor segments 22 lying in a row but are primarily used to join two join two adjacent rows of floor segments 22 at the front. FIG. 4 illustrates this laying principle in a highly simplified view from above. Two rows of floor segments 22 are shown, each connected together by means of claws 30 and double hooks 32. Between groups of four floor segments 22 connecting elements 24 are provided instead of the claw 30/double hook 32 connection. The two rows of floor segments 22 are arranged in such a manner that the connecting elements 24 of the two rows each abut against one another at the front. Connectors 40 extend into the neighbouring connecting elements 24, are screwed and thus hold the rows against one another.

FIGS. 5 to 8 show the connecting element 24 which can also consist of a resistant material such as steel, aluminium or plastic, in a sectional view and from above (FIG. 5). The sectional views correspond to the line of intersection I-I in FIG. 5. In this embodiment the connecting element 24 consists of a first part element 26 and a second part element 28. The first part element 26 comprises a claw 30 which corresponds to the claw 30 of a floor segment 22 and by which means it can be connected to a double hook 32 of a floor segment 22. The second part element 28 accordingly comprises a double hook 32 which can be connected to a claw 30 of a floor segment 22. The two part elements 26, 28 lie above one another in sections when viewed in cross-section and together form approximately the same height H as the floor segments 22 (cf. FIG. 2).

The part elements 26, 28 each have hollow chambers 44 which lead to a relatively low weight. It is clear from FIGS. 6 to 8 that when the part elements 26, 28 are assembled, a connecting channel 38 is formed into which a connector 40 can be inserted (cf. FIG. 11 also). It is also possible to identify a nut channel 46 into which a nut 37 of a connecting means 36 can be inserted and held therein. The nut 37 and the nut channel 46 have such dimensions that the nut 37 is held rotationally fixedly in the nut channel 46, making it easier to assemble the connection.

FIGS. 9 to 11 show a sectional view along the line of intersection II-II from FIG. 5. A connecting means 36, preferably a screw 35, can be inserted through connecting openings 34 and connected thereto with nut 37. It can also be seen that the connecting opening 34 of the first part element 26 is finally formed by an opening in the hollow chamber 44. For this purpose, the upper side of the hollow chamber 44 facing the useful area 21 has a first opening 48 which is designed as an elongated hole and has dimensions exceeding the lower second opening 50 of the hollow chamber 44 facing the second part element 28. The first opening 48 has larger dimensions because in addition to a screw head 52, a socket, not shown, of a fastening tool for tightening and loosening the screw 35 must also be inserted therein. The second opening 50 of the first part element 26 is preferably designed as an elongated hole so that the two part elements 26, 28 can be displaced by a certain amount with respect to one another and can be connected despite this (cf. also FIG. 5).

The part elements 26, 28 are firmly connected to one another, the connecting means 36 being located completely inside the connecting element 24 FIG. 8). It can also be seen that as much material as possible is enclosed between the nut 35 and the screw head 52. A column S is formed, giving the connection stability particularly against kinking and pivoting forces upwards and downwards in the direction of the useful area 21 or the support surface 23.

FIGS. 12 and 13 illustrate the arrangement and function of the connector 40. The connector 40 is preferably configured as an elongated tab having connecting openings 34 at each of its free ends, which can be inserted between the part elements 26, 28 in such a manner that the connecting means 36 can be passed through all the connecting openings 34. The connecting means 36 therefore connects the part elements 26, 28 to one another but also holds the connector 40 between the part elements 26, 28. The connector 40 thus serves to connect two adjacent connecting elements 24 at the front. At least one connecting opening 34 of the connector 40 is designed as an elongated hole. The width of the connector is smaller than the width of the connecting channel 38 to allow pivoting of the connector 40 within the connecting channel 38. In a preferred embodiment according to the invention, the connector 40 is designed as waisted as indicated by the dashed line in FIG. 13. The waisting allows a further offset of the two connecting elements 24 with respect to one another.

The invention is not restricted to the exemplary embodiment show but also embraces other embodiments having the same effect.

The invention claimed is:

1. A connecting element (24) for a segmented floor covering (20), the connecting element comprising a first part element (26) and a second part element (28), each having connecting openings (34) by which means the part elements are connected to one another by a connecting means (36) such that substantially adjacent planar end portions of the connecting elements (26, 28) overlap one another, and which in the assembled state form a connecting channel (38) in which a connector (40) is disposed, which connector also has a connecting opening (34) for the connecting means (36), wherein the connector (40) projects laterally from the connecting element (24) in such a manner that it is inserted into a connecting channel (38) of a neighboring connecting element (24) and a connecting means (36) can likewise extends there through a second connecting opening (34) so that two connecting means (24) located adjacent to one another are connected to one another by the connector (40), wherein the connecting means (36) has dimensions such that it does not protrude over a useful area (21) of the floor covering (20).

2. The connecting element (24) according to claim 1, wherein the part elements (26, 28) have fastening means for fastening the part elements to floor segments (22) of the floor covering (20).

3. The connecting element (24) according to claim 2, wherein the first part element (26) has a claw (30) as fastening means and the second part element (28) has a double hook (32) as fastening means which are connected to respectively corresponding fastening means of the floor segments (22) of the same type.

4. The connecting element (24) according to claim 1, wherein the part elements (26, 28) have hollow chambers (44).

5. The connecting element (24) according to claim 4, wherein the connecting opening (34) of the first part element (26) is formed by an opening in the hollow chamber (44), wherein a side of the hollow chamber (44) facing the useful area (21) has a first opening (48) which is designed as an elongated hole and has dimensions exceeding a lower second opening (50) of the hollow chamber (44) facing the second part element (28) which is also designed as an elongated hole.

6. The connecting element (24) according to claim 1, wherein the connector (40) is configured as an elongated tab whose width is less than the width of the connecting channel (38).

7. The connecting element (24) according to claim 1, wherein the connector (40) is configured as an elongated tab whose height exceeds the height of the connecting channel (38).

8. The connecting element (24) according to claim 1, wherein the connecting element connects floor segments (22) which are designed as hollow bodies with supporting webs (42) extending vertically therein.

9. The connecting element (24) according to claim 8, wherein the floor segments (22) have a length (L) of about 3 meters (m), a width (B) of about 0.5 meters (m) and a height (H) of about 0.05 meters (m).

10. The connecting element (24) according to claim 8, wherein the floor segments (22) consist of aluminium and have a wall thickness of about 0.003 meters (m).

11. A connecting element (24) for joining segments of a floor covering (20), the connecting element comprising:

a first part element (26) having at least one opening (34);

a second part element (28) having at least one opening (34);

a means for connecting (screw 35 and nut 37) substantially adjacent planar end portions of the first and second part elements to each other in overlapping fashion, the connecting means positioned in at least one opening in each of the first and second part elements;

a connector (40) for linking one or more adjacent connecting elements, the connector having at least one opening (34) for receiving at least one connecting means, the openings in the first part element, second part element, and connector correspondingly aligned with respect to one another for receiving the connecting means, the connector securing the connecting means of one connecting element to the connecting means of another adjacent connecting element; and a connecting channel (38) defined by the first and second part elements when assembled, the connecting channel for receiving at least a portion of the connector;

wherein the connector extends laterally from the connecting channel of the connecting element and into a connecting channel of an adjacent connecting element; and wherein the connecting means (36) is contained within the connecting element and positioned interior of an outer surface of the floor covering.

\* \* \* \* \*